US006891165B2

(12) United States Patent
Buffet et al.

(10) Patent No.: US 6,891,165 B2
(45) Date of Patent: May 10, 2005

(54) IONIZING RADIATION DETECTOR AND METHOD FOR MANUFACTURING SUCH A DETECTOR

(75) Inventors: Jean-Claude Buffet, Laval (FR); Bruno Guerard, Grenoble (FR)

(73) Assignee: Institut Max Von Laue-Paul Langevin, Grenoble (FR)

( * ) Notice: Subject to any disclaimer, the term of this patent is extended or adjusted under 35 U.S.C. 154(b) by 155 days.

(21) Appl. No.: 10/313,883

(22) Filed: Dec. 6, 2002

(65) Prior Publication Data

US 2003/0150999 A1 Aug. 14, 2003

(30) Foreign Application Priority Data

Dec. 7, 2001 (FR) ............................................ 01 15898

(51) Int. Cl.[7] ........................... G01T 1/164; H01J 47/08
(52) U.S. Cl. .................................... 250/374; 250/385.1
(58) Field of Search ............................. 250/374, 385.1, 250/375, 382, 389, 363.03

(56) References Cited

U.S. PATENT DOCUMENTS 3,930,162 A 12/1975 Reiss ......................... 250/385
4,289,967 A 9/1981 Hanson et al. .............. 250/385
4,684,806 A * 8/1987 Mitrofanov ................ 250/374
6,483,114 B1 * 11/2002 Lacy ..................... 250/363.03
6,627,897 B1 * 9/2003 Francke et al. .......... 250/385.1

FOREIGN PATENT DOCUMENTS

EP 1 030 346 A2 8/2000

OTHER PUBLICATIONS

"A Multi–Element Proportional Counter for Radiation Protection Measurements", P. Kliauga et al., Health Physics, Pergamon Press Ltd. Oxford, GB, vol. 57, No. 4, Oct. 1989, pp. 631–636.

* cited by examiner

*Primary Examiner*—Constantine Hannaher
*Assistant Examiner*—Otilia Gabor
(74) *Attorney, Agent, or Firm*—Duane Morris LLP

(57) ABSTRACT

An ionizing radiation detector comprising a plurality of conductive tubes arranged in parallel fashion containing a gas mixture under pressure, a conductive wire being tensed at the center of each tube and adapted to being polarized with respect thereto, and comprising first and second tight enclosures each having a wall provided with openings in which are tightly inserted the first and second ends of each tube, the ends of each tube being open.

8 Claims, 4 Drawing Sheets

IONIZING RADIATION DETECTOR AND METHOD FOR MANUFACTURING SUCH A DETECTOR

BACKGROUND OF THE INVENTION

1. Field of the Invention

The present invention relates to the field of particle or ionizing radiation detectors, and in particular detectors of neutrons, γ- or X-rays.

2. Discussion of the Related Art

FIG. 1 schematically shows the conventional structure of a cell 2 sensitive to an ionizing radiation, using the same detection principle as the present invention. This cell comprises a conductive tube 4 filled with a gas mixture, sealed at its ends by isolating plugs 6. A conductive wire 8, the ends of which tightly cross plugs 6, is maintained tensed at the center of tube 4 by a spring 10 located within the tube. A positive electric voltage applied to wire 8 by means of a measurement circuit 12 enables defining within the tube an electric field which is favorable to the drifting and to the amplification of electrons generated at the passing of the ionizing radiation, which enters the tube in a direction approximately orthogonal to the axis of the tube. A resistive wire is used in a case where a position measurement along the tube is desired to be performed by charge division. The measurement circuit then comprises read electronics enabling measurement of the charge signal amplitude at each end of the wire. Another so-called "counting" operating mode uses electronics based on the comparison, with respect to a reference voltage, of the signal measured at a single end of the wire. The gas mixture contained in the tube is provided to be ionized by the particles which are desired to be detected, either directly, or after conversion into ionizing particles. For example, a mixture of $CF_4$ and $He_3$ in which $He_3$ plays the role of a converter, and $CF_4$ that of a stopping gas of the two ionizing particles (proton and triton) emitted after capture of a neutron by an $He_3$ atom, is used in the case of neutron detection The dimensions of tube 4 and the pressure at which the gas mixture is confined are very variable. As an example, tube 4 may have a width of approximately one meter, a diameter of approximately 8 mm and a thickness of approximately 0.2 mm, and the gas mixture may be confined in the tube at a pressure of approximately 15 bars. The forming of such a cell, which implies a perfectly tight welding of plugs 6 under a high pressure, after positioning of the wire, is particularly expensive. It is possible to provide individual filling means for each cell, but this creates an undesirable additional mechanical bulk.

Distance δ existing between the internal wall of tube 4 and spring 10 conditions the maximum electric voltage or breakdown voltage that can be applied between the electrodes and the tube. The larger the diameter of spring 10 with respect to the diameter of tube 4, the lower the breakdown voltage, at which electric arcs form between the spring and the tube wall. Further, the uniformity of the cell response is affected by the inaccuracy of the wire centering inside of the tube, and such a wire centering is difficult to perform by means of spring 10. In practice, the presence of spring 10 in the tube and the difficulty of the centering of wire 8 by means of spring 10 limit the maximum amplification gain with which the detector can operate, which has direct consequences upon the detector performances (energy and position resolution).

An ionizing radiation detector is conventionally formed of several cells 2, the tubes of which are juxtaposed and form a sensitive surface. The operation of a cell depends on the quality and on the pressure of the gas mixture that it contains. Now, it is difficult to form several sensitive cells comprising a same gas mixture with a long-term stability and identical for all cells. As a result, no sensitive cell really has an operation identical to the others.

The assembly of several cells requires an accurate mechanism. Further, when several sensitive cells must be used together with a minimum space between the tubes, it is difficult to ensure the continuity of the electromagnetic shielding between the tube envelope and measurement circuit 12 without extending beyond the external diameter of the tube, which results in creating dead spaces between cells, whereby a loss of sensitivity of the assembly. This constraint, and those imposed by inner spring 10, limit the minimum diameter of the tubes to approximately 7–8 mm. Further still, a sensitive cell may wear out and need changing, for example, if the gas mixture that it contains has been altered under the influence of the received radiation. Especially, it is known that a gas mixture of butane and argon contained in the sensitive cells used for the X-ray detection may form polymers around the wires under the effect of the radiation and alter the operation of the sensitive cell. The replacing of a cell is expensive.

SUMMARY OF THE INVENTION

An object of the present invention is to provide an assembly which is simple and inexpensive to form of cells sensitive to ionizing radiation.

Another object of the present invention is to provide such an assembly which has a low maintenance cost.

Another object of the present invention is to provide such an assembly formed of sensitive cells having a homogenous operation.

Another object of the present invention is to provide such an assembly comprising tubular sensitive cells of small diameter standing a high amplification gain.

To achieve this object, the present invention provides an ionizing radiation detector comprising a plurality of conductive tubes arranged in parallel fashion containing a gas mixture under pressure, a conductive wire being tensed at the center of each tube and adapted to being polarized with respect thereto, and comprising first and second tight enclosures each having a wall provided with openings in which are tightly inserted the first and second ends of each tube, the ends of each tube being open.

According to an embodiment of the present invention, a leaky conductive wire centering means is assembled at each end of each tube.

According to an embodiment of the present invention, the wire is maintained tensed at least one end of each tube by means of a tension means arranged outside of the tube.

According to an embodiment of the present invention, at said at least one end of each tube, the centering means comprises a cap in an isolating material attached to the tube and provided with an axial bore capable of guiding the wire.

According to an embodiment of the present invention, the cap of isolating material is crossed along the revolution axis of the tube by a first cylindrical opening in which is slidably mounted a socket imprisoning the end of the wire, the tension means bearing on the cap of isolating material and urging the socket towards the outside of the tube, a second opening crossing the cap in isolating material between the inside of the tube and of the tight enclosure to which the tube is attached.

According to an embodiment of the present invention, the tube ends have a predetermined diameter lower than the diameter of the tube bulk, the openings of the walls in which are inserted the ends of two adjacent tubes being distant by a space equal to the difference existing between the diameter of the end of the tubes and the diameter of the tube bulk.

The present invention also aims at a method for manufacturing an ionizing radiation detector comprising the steps of: inserting the first and second ends of a plurality of conductive tubes into openings made in a wall of a first and of a second tight enclosures so that the tubes are arranged in parallel fashion; attaching simultaneously or one after the other by welding each end of each tube in the opening of which said end is inserted, so that the inside of the tubes and the inside of the tight enclosures are tightly connected; and filling the tight enclosures and the tubes with a predetermined gas mixture at a predetermined pressure.

The foregoing objects, features and advantages of the present invention will be discussed in detail in the following non-limiting description of specific embodiments in connection with the accompanying drawings.

DETAILED DESCRIPTION

Figure 1:
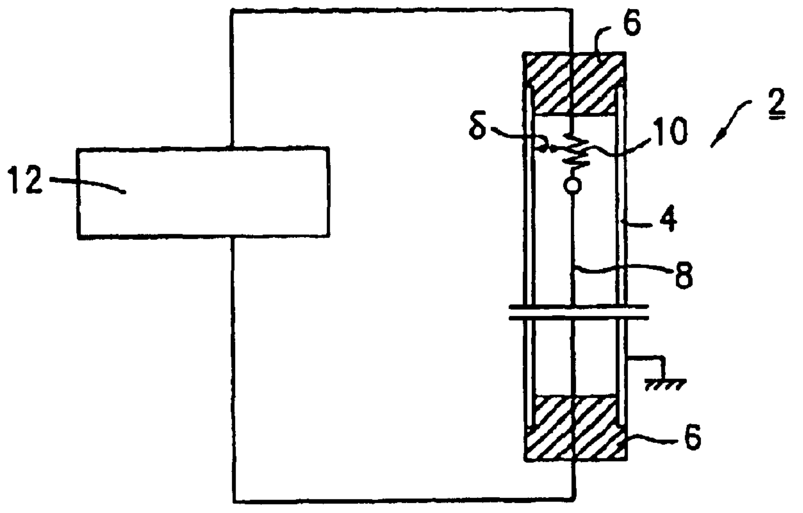
(PRIOR ART) FIG. 1
FIG. 1, previously described, is a simplified cross-section view of a conventional cell sensitive to ionizing radiation.
Figure 2:
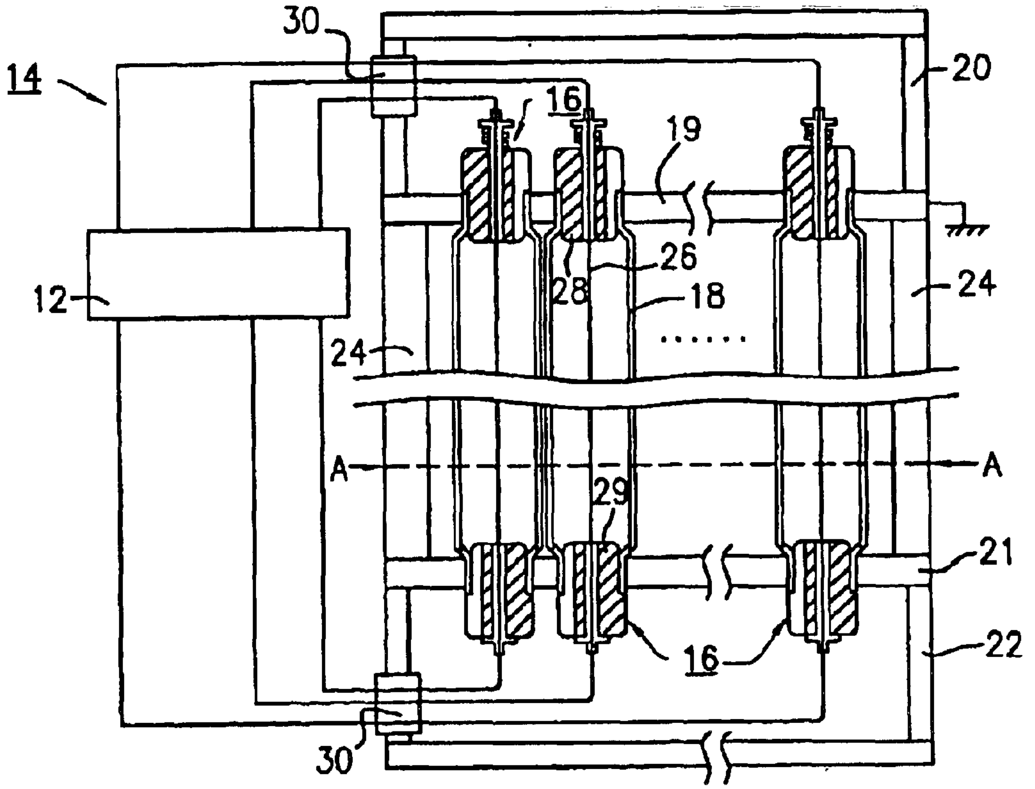
FIG. 2 is a simplified cross-section view of an ionizing radiation detector according to the present invention.

FIG. 2 schematically shows a detector 14 according to the present invention, comprising a sensitive surface formed of a juxtaposition of tubular sensitive cells 16. Each sensitive cell 16 comprises a conductive tube 18, a first end of which crosses a metallic wall 19 of a tight enclosure 20 and the second end of which crosses a wall 21 of a tight enclosure 22. The ends of tubes 18 are welded to walls 19 and 21 of enclosures 20 and 22 so that the tubes 18 and the enclosures 20 and 22 can be filled together with a single gas mixture under pressure. The ends of tubes 18 have a diameter smaller than the diameter of the tube bulk. The openings of walls 19 and 21 in which are inserted the ends of two adjacent tubes are distant by an interval equal to the difference between the diameter of the ends of the tubes and the tube bulk diameter. This interval between two adjacent openings enables easy welding of the tube ends to walls 19 and 21. Enclosures 20 and 22, formed in a conductive material, are joined together by bracings 24 which ensure the rigidity of the assembly while forming no screen between the radiations to be detected and the tubes. Each sensitive cell 16 comprises a conductive wire 26, which is resistive in the case of a longitudinal localization version, maintained tensed at the center of tube 18 by caps 28 and 29 respectively arranged at the ends of tube 18 in enclosures 20 and 22. Caps 28 and 29 are further provided to ensure the communication between enclosures 20 and 22 and tubes 18. One at least of enclosures 20 and 22 is connected to means not shown enabling creating vacuum and bringing the gas mixture to the desired pressure. The ends of conductive wires 26 are connected to tight electric seal wires 30 arranged in the walls of enclosures 20 and 22. These seal wires are connected to a measurement circuit 12 via appropriate connectors.

According to the present invention, the manufacturing of the detector is particularly simple. In a first step, tubes 18 may be assembled with no welding to walls 19 and 21, for example, by mere insertion into openings made for this purpose in the walls. In a second step, the tubes may all be welded to walls 19 and 21 one after the other or at once in a furnace. An alternative of the present invention also provides welding together the adjacent tubes, to rigidify the tube assembly. The simultaneous welding of all the tubes of a detector according to the present invention represents a particularly advantageous time gain and saving. In a third step, walls 19 and 21 are assembled to other elements to define enclosures 20 and 22. The inside of the assembly is degassed, after which the desired gas mixture is introduced into enclosures 20 and 22 and into tubes 18.

Advantageously, the gas mixture contained in a detector according to the present invention may easily be changed. A same detector filled with different gas mixtures may thus be used for the detection of several types of ionizing radiation.

Also advantageously, a wall of each enclosure is removable to enable easy access to the wires of the sensitive cells, and thereby easy and inexpensive replacement of a defective or damaged wire.

Advantageously, a tube assembly according to the present invention forms a single mechanical block, which suppresses assembly problems which used to be posed with individual tubes according to prior art.

Figure 3:
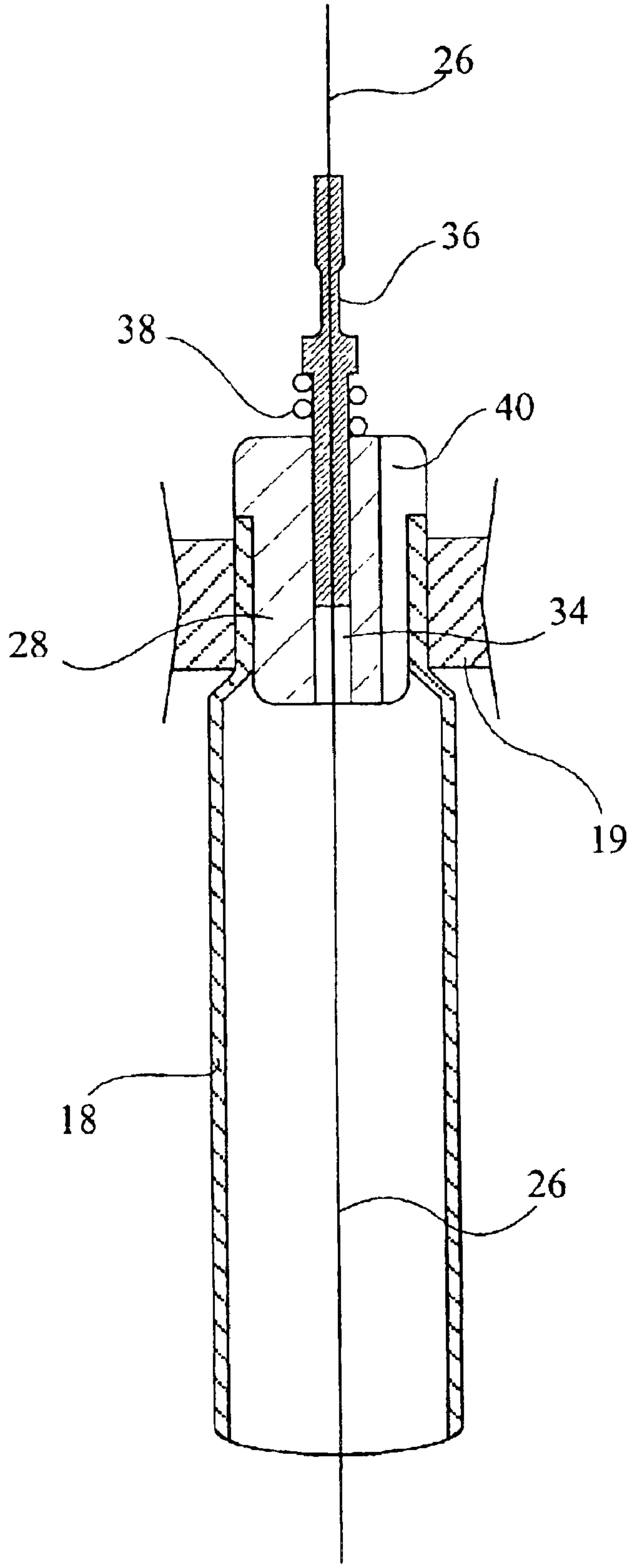
FIG. 3 is a more detailed cross-section view of an end of a sensitive cell according to the present invention.

FIG. 3 shows an end of a tube 18 attached to an opening of wall 19. Wire 26 is maintained tensed at the center of tube 18 by a cap of isolating material 28 attached to the end of tube 18. Cap 28 is crossed along the revolution axis of the tube by a cylindrical opening 34 in which is slidably assembled a crimp socket 36. The end of wire 26 is crimped in socket 36. A spring 38 bears on cap 28 and urges socket 36 to the outside of the tube to maintain wire 26 tensed at the center of the tube. An opening 40 crosses cap 28 to have the gas mixture contained in the tube and in enclosure 20 or 22 communicate. Cap 29 attached to the end of tube 18 attached to wall 21 has a structure identical to that of FIG. 3, but comprises no spring 38. Socket 36 directly bears against cap 29.

The centering and tension holding structure of wire 26, comprising caps 28 and 29, sockets 36 and spring 38, does not aim at ensuring any tightness of tube 18. As a result, the forming of such a structure is particularly simple and enables maintaining each wire 26 tensed precisely at the center of the ends of tube 18 of each sensitive cell. It is thus possible to form sensitive cells formed of tubes 18 of small diameter and having a high amplification gain. The structure comprising caps 28 and 29, sockets 36 and spring 38 enabling formation of sensitive cells all having the same geometry, and the sensitive cells all containing a same gas mixture at a same pressure, the sensitive cells exhibit a high and perfectly uniform amplification gain.

Figure 4:
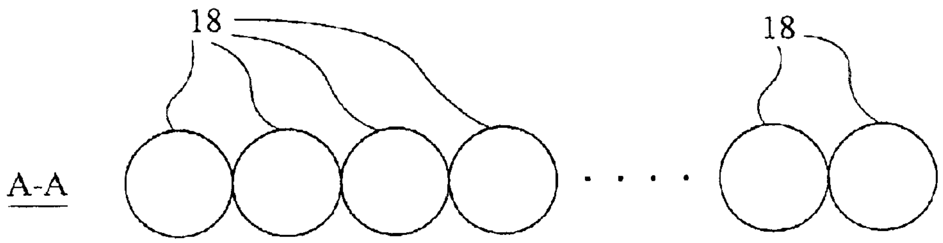
FIG. 4 schematically shows a transversal cross-section view of the detector according to the present invention taken along plane A—A of FIG. 2.

FIG. 4 very schematically shows a top view of tubes 18 of detector 14 of FIG. 2. Tubes 18, which join, are arranged in a plane so that the sensitive surface of the detector is planar. In practice, a detector according to the present invention may comprise a large number of tubes.

Of course, the present invention is likely to have various alterations, modifications, and improvements which will readily occur to those skilled in the art. In particular, the present invention has been described in relation with a detector, the sensitive surface of which is formed of sensitive cells arranged in a plane, but those skilled in the art will easily adapt the present invention to a detector, the sensitive cells of which are arranged differently.

Figure 5:
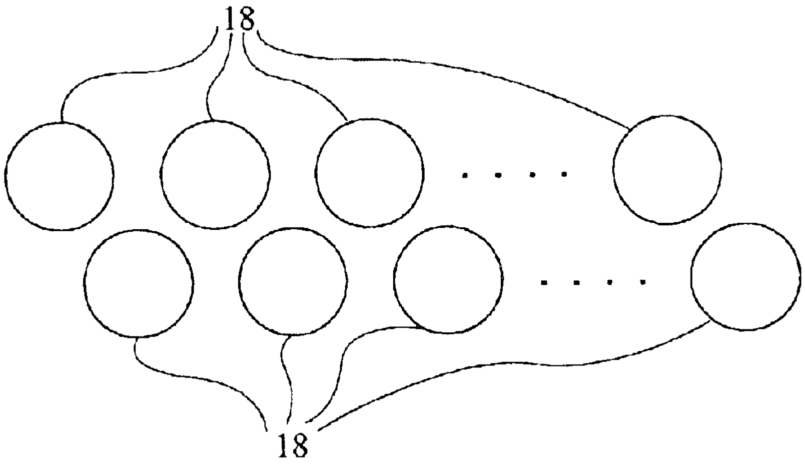
FIGS. 5 and 6 schematically show transversal cross-section views of two alternative embodiments of the present invention.

FIG. 5 shows as an example a cross-sectional top view of the tubes 18 of a detector according to an alternative embodiment of the present invention. Tubes 18 are arranged in parallel fashion, without joining, in quincunx along two parallel planes. Such a tube arrangement especially enables improving the detection efficiency. Since tubes 18 do not join, the diameter of tubes 18 can be constant along their entire length.

Figure 6:
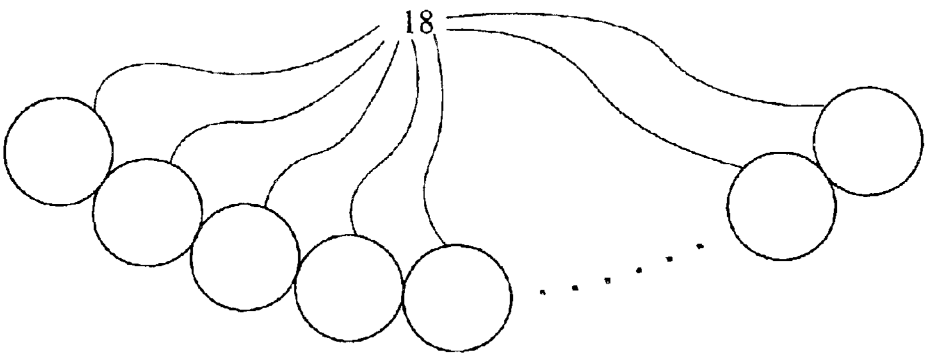

FIG. 6 shows a cross-section view of tubes 18 of a detector according to another alternative embodiment of the present invention. Tubes 18 join and are arranged to form a substantially curved surface, for example, in an arc of a circle.

The present invention has been described in relation with a detector comprising a group of tubes, the first and second ends of which are connected to first and second tight enclosures, the tight enclosures each comprising at least one tight electric seal wire 30.

Figure 7:
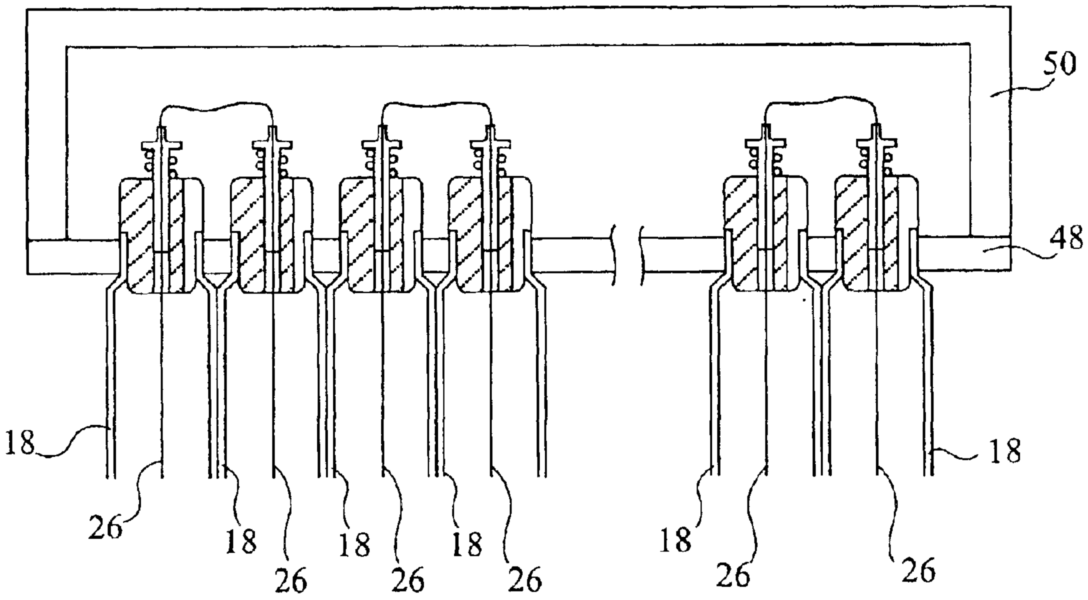
FIG. 7 is a simplified cross-section view of an ionizing radiation detector according to an alternative embodiment of the present invention.

FIG. 7 is a cross-section view of a tight enclosure 50 of a detector according to an alternative embodiment of the present invention. The detector comprises a group of tubes 18, first ends of which are connected to a wall 48 of enclosure 50. The second ends of tubes 18, not shown, are attached to the wall of a tight enclosure such as enclosure 20 or 22 of FIG. 2. In enclosure 50, the ends of wires 26 located in adjacent tubes 18 are connected two by two, whereby enclosure 50 comprises no tight connector 30. Such an alternative embodiment enables dividing by two the number of read paths of measurement circuit 12, and decreasing the dead area generated by one of the two enclosures.

Figure 8:
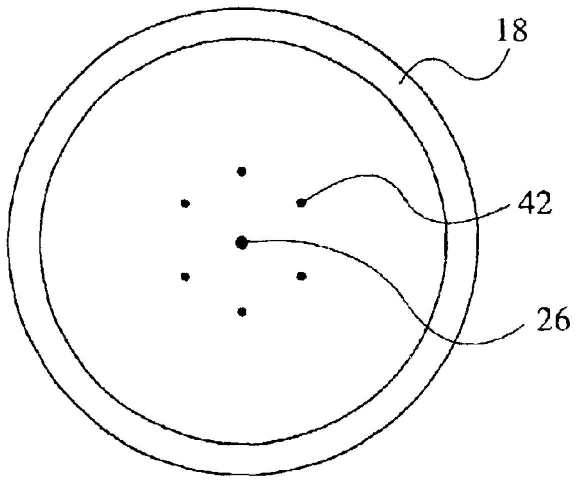
FIG. 8 is a simplified cross-section view of a sensitive cell of an ionizing radiation detector according to an alternative embodiment of the present invention.

FIG. 8 is a simplified cross-section view of a tube of a sensitive cell of an ionizing radiation detector according to an alternative embodiment of the present invention. A number of cathode conductive wires 42 are maintained tensed in parallel fashion around the central anode conductive wire 26, closer to the anode wire than to the walls of the tube 18. For example, for a tube with a diameter of about 2–3 cm, the cathode wires may be tensed at a distance of 2–3 mm from the anode wire. FIG. 8 is not drawn to scale for clarity sake. Six cathode wires 42 are drawn in FIG. 8, but any appropriate number of cathode wires may be used. The caps of isolating material attached to the ends of each tube would then be crossed by cylindrical openings arranged along a circle around the central cylindrical opening to each receive slidably one of said cathode conductive wires, the end of which might be imprisoned by a socket, which would provide for an easy to build and easy to maintain structure.

In an embodiment, the cathode wires would be biased to a voltage intermediate between the voltage of the anode and the voltage of the tube. This would provide for a first electrical field called drift field between the walls of the tube and the cathode wires and for a second field called amplification field between the cathode wires and the anode wire. The drift and amplification fields may be optimized separately so as to reduce the collection time of the electrons generated in the tube by the radiations.

Moreover, the cathode wires may be connected independently or in sub-groups so as to give an angular information about where the electrons are generated.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An ionizing radiation detector comprising a plurality of conductive tubes (18) arranged in parallel fashion containing a gas mixture under pressure, a conductive wire (26) being tensed at the center of each tube and adapted to being polarized with respect thereto, the ionizing radiation being directed approximately orthogonally to the direction of the tubes, comprising:

first and second tight enclosures (20, 22) each having a wall provided with openings in which are tightly inserted the first and second ends of each tube (18), the ends of each tube being open.

2. The detector of claim 1, wherein a leaky conductive wire centering means (28) is assembled at each end of each tube (18).

3. The detector of claim 2, wherein the wire (26) is maintained tensed at least one end of each tube (18) by means of a tension means (38) arranged outside of the tube (18).

4. The detector of claim 3, wherein at said at least one end of each tube (18), the centering means comprises a cap (28) in an isolating material attached to the tube and provided with an axial bore capable of guiding the wire (26).

5. The detector of claim 4, wherein the cap (28) of isolating material is crossed along the revolution axis of the tube (18) by a first cylindrical opening (34) in which is slidably mounted a socket (36) imprisoning the end of the wire (26), the tension means (38) bearing on the cap of isolating material (28) and urging the socket (36) towards the outside of the tube, a second opening (40) crossing the cap (28) in isolating material between the inside of the tube (18) and of the tight enclosure (20, 22) to which the tube is attached.

6. The detector of any of the foregoing claims, wherein the ends of the tubes (18) have a predetermined diameter lower than the diameter of the tube bulk, the openings of the walls (20, 22) in which are inserted the ends of two adjacent tubes (18) being distant by a space equal to the difference existing between the diameter of the end of the tubes and the diameter of the tube bulk, said ends of the tube being welded to said openings of the walls.

7. The detector of claim 1, wherein a plurality of conductive wires (42) are maintained tensed in a parallel fashion around the central conductive wire (26) of each tube (18).

8. A method for manufacturing an ionizing radiation detector comprising the steps of:

inserting the first and second ends of a plurality of conductive tubes (18) into openings made in a metallic wall of a first (20) and of a second (22) tight enclosures so that the tubes are arranged in parallel fashion;

attaching simultaneously or one after the other by welding each end of each tube (18) in the opening of which said end is inserted, so that the inside of the tubes (18) and the inside of the tight enclosures (20, 22) are tightly connected; and filling the tight enclosures (20, 22) and the tubes (18) with a predetermined gas mixture at a predetermined pressure.

* * * * *